United States Patent [19]

Wilkerson

[11] 4,027,220
[45] May 31, 1977

[54] REGENERATIVE MOTOR CONTROL HAVING IMPROVED FIELD CIRCUIT

[75] Inventor: Alan W. Wilkerson, Thiensville, Wis.

[73] Assignee: Allen-Bradley Company, Milwaukee, Wis.

[22] Filed: May 5, 1975

[21] Appl. No.: 574,550

[52] U.S. Cl. ............................................. 318/376
[51] Int. Cl.² ........................................ H02P 3/14
[58] Field of Search .......... 318/373, 374, 375, 376, 318/377, 381

[56] References Cited
UNITED STATES PATENTS

| | | | |
|---|---|---|---|
| 3,398,343 | 8/1968 | Plumpe, Jr. ................... | 318/376 X |
| 3,486,102 | 12/1969 | Wilkerson .................... | 318/376 X |
| 3,538,404 | 11/1970 | Risberg ....................... | 318/376 X |

Primary Examiner—Robert K. Schaefer
Assistant Examiner—W. E. Duncanson, Jr.
Attorney, Agent, or Firm—Andrus, Sceales, Starke & Sawall

[57] ABSTRACT

The field circuit of a regenerative direct current motor control provides rapid reversal of motor field current by discharging the inductive energy of the winding back to an alternating current power supply. This is accomplished by firing the thyristors means in the field circuit late in the half cycles of alternating current by means of an improved firing circuit.

7 Claims, 5 Drawing Figures

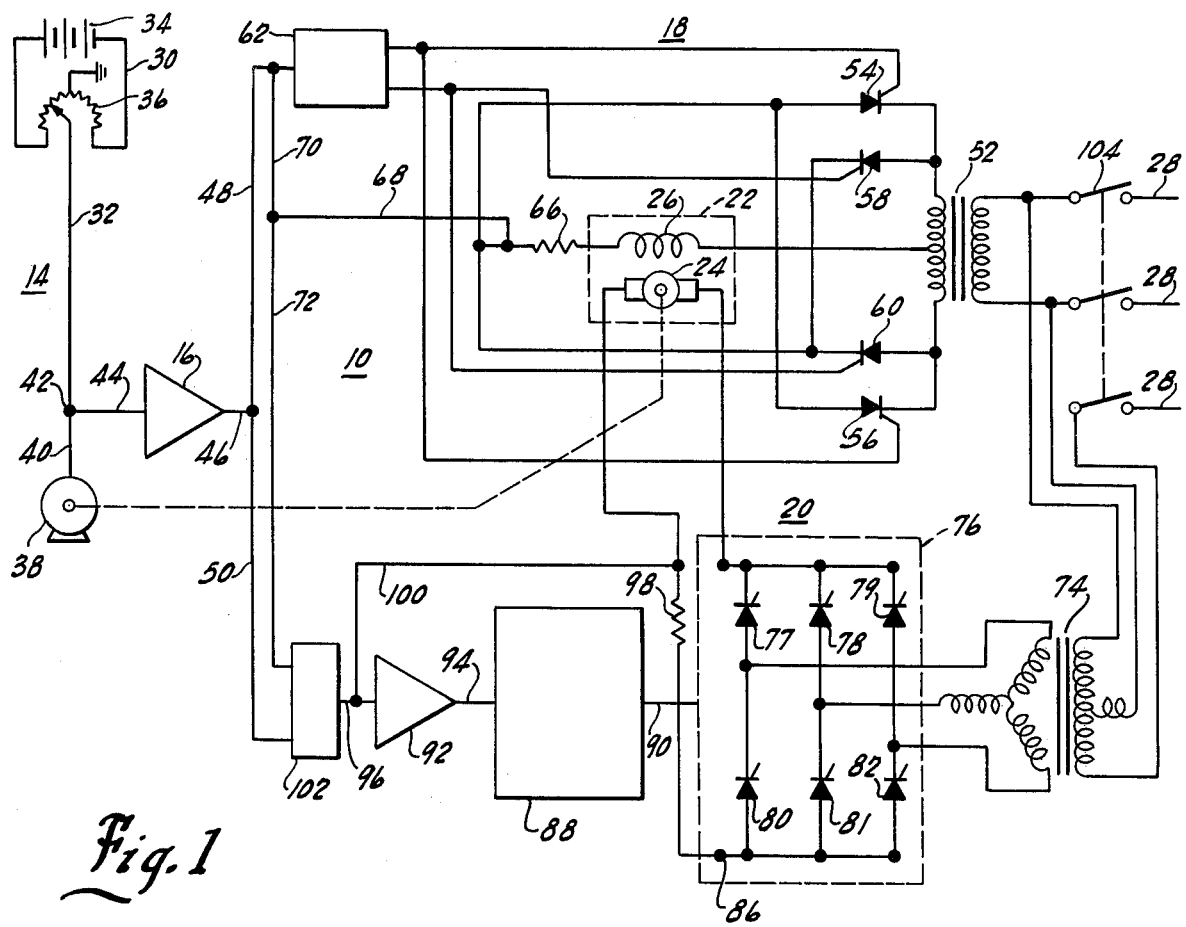
Fig. 1
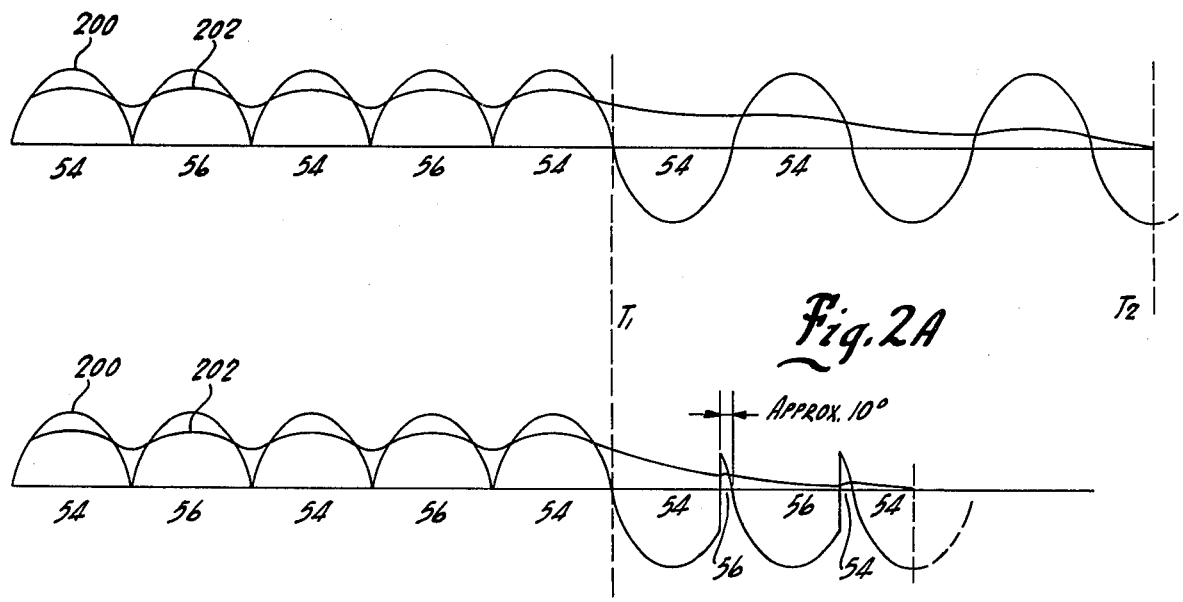
Fig. 2A
Fig. 2B

REGENERATIVE MOTOR CONTROL HAVING IMPROVED FIELD CIRCUIT

BACKGROUND OF THE INVENTION

1. Field of the Invention

The present invention relates to electrical motor power systems and more particularly to those providing regenerative braking to a direct current motor.

2. Description of the Prior Art

In regenerative direct current motor controls, the braking of the motor necessary for precise speed regulation or other desired operating characteristics is obtained by applying the power generated in the motor during braking back to the active power source for the motor, such as a.c. supply lines.

Regenerative braking is advantageous in that, with proper control of armature current, braking may be done on a permanent basis, whereas resistive braking or other methods, such as plugging, are normally utilizable only in transient conditions or for isolated stops. Braking may also be accomplished very rapidly by regeneration.

Power may be regenerated or returned to the active motor power source by maintaining the same polarity of motor armature voltage while reversing the direction of armature current flow, as in "armature reversing" regenerative motor controls. Motor power may also be regenerated by maintaining motor armature current flow in the same direction while reversing the polarity of the armature voltage. Armature voltage reversal is obtained by reversing the motor field. A motor control employing this technique is termed a "field reversing" regenerative control and is the type to which the present invention is directed. A field reversing control includes a field circuit for reversing the motor field and an armature circuit for coordinately controlling the motor armature current.

The field circuit typically includes two groups of thyristors connected to an alternating current power source. The groups of thyristors control the direction and magnitude of the field current. The thyristors are controlled by a firing circuit which determines which group of thyristors is rendered conductive in accordance with the polarity of a motor operative condition error signal and determines the firing angle of the thyristors in accordance with the magnitude of the error signal.

In regenerative braking operation, the reversal of the motor field reverses the polarity of the motor flux and the armature counter e.m.f., assuming the direction of motor rotation remains instantaneously the same. The reversed counter e.m.f. biases thyristors in a thyristor bridge between the a.c. supply lines and the motor armature for current conduction in the same direction as during motoring anytime the counter e.m.f. is more negative than the a.c. supply lines voltage. This will include a portion of the negative half cycles of the alternating current power, thus permitting the reversal of voltage necessary for regeneration.

The reversal of the motor field winding current necessary for regeneration cannot be achieved instantaneously due to the inductance of the winding. This gives rise to a transient period in the operation of the regenerative motor control during which the motor is neither motoring nor regenerating but is essentially uncontrolled. Because of the uncontrolled state of the motor during this time interval, the precise speed regulation desired of a regenerative motor control is lessened.

To reduce the duration of the transient period, improved regenerative motor controls of the prior art have provided for reduction of the winding current by discharging the inductive energy of the motor field winding back to the motor field power supply. This is accomplished by firing the thyristors in the field circuit in the latter portions of each half cycle of the alternating current.

In the past, firing circuits for achieving such operation have generally utilized a pair of pulse generating circuits in the firing circuit for each group of thyristors. A first pulse generating circuit fires the thyristors during their conductive periods responsive to the magnitude of an input signal to the firing circuit derived from the motor operative condition error signal. The second pulse generating circuit responds to the alternating voltage as it approaches zero near the end of the conductive periods. The latter pulses produced by the latter circuit are used to discharge the field, since the inductive current of the field winding extends the conduction of the thyristors produced by the latter pulses into the negative half cycles of the alternating voltage, permitting regenerative discharge of the field to occur.

However, because the provision of the second or latter pulses depends upon line voltage, transients in this voltage may detrimentally affect the provision of these pulses.

SUMMARY OF THE PRESENT INVENTION

It is, therefore, the object of the present invention to provide a regenerative direct current motor control having a field thyristor means firing circuit which eliminates the dual sources found in prior art circuits and, instead, places a limit on the range of control over a single controlled source firing pulses. This limit is achieved by the inclusion of a bias means in the firing circuit which insures that even in the absence of an input signal to the firing circuit, the thyristors will be fired at least once during each conductive half cycle of the thyristors. This firing occurs in the latter portion of the cycles. The use of a bias circuit renders the provision of a firing pulse during each half cycle independent of the line voltage and transients appearing therein.

BRIEF DESCRIPTION OF THE DRAWING

FIG. 1 is a block diagram of a static, regenerative direct current motor control having the improved field circuit of the present invention.

FIGS. 2a and 2b are graphs illustrating the operation of the motor field including the regenerative discharge obtained by the field circuit of the present invention.

DESCRIPTION OF THE PREFERRED EMBODIMENT

Figure 3:
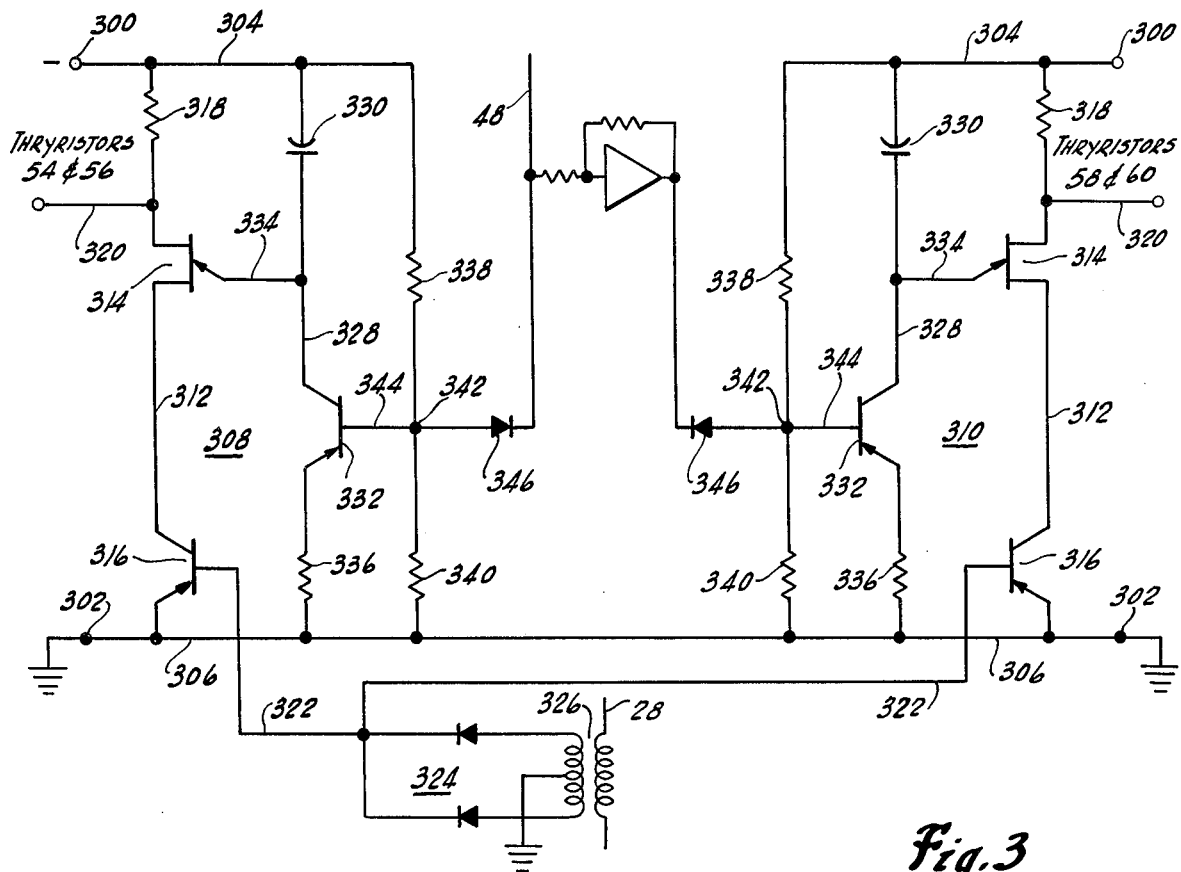
FIG. 3 is a schematic diagram of one embodiment of the firing circuit incorporated in the field circuit.

Referring now to FIG. 1, there is shown therein regenerative direct current motor control 10 constructed in accordance with the present invention. Control 10 utilizes reference and feedback circuit 14 and includes input amplifier 16, field circuit 18, and armature circuit 20. The control drives direct current motor 22 having an armature 24 and a field 26, each of which includes or comprises an electro-magnetic winding. The control is provided with input power from a.c. lines 28.

Reference and feedback circuit 14 includes a reference signal source 30 providing a variable d.c. signal to conductor 32 by means of d.c. supply 34 and potentiometer 36. A feedback signal may be provided by tach-generator 38 which is connected to armature 24 and supplies a d.c. signal corresponding to the speed of armature 24 to conductor 40. Feedback signals corresponding to other operative conditions in the motor, such as torque, or operational conditions in the apparatus driven by the direct current motor, as for example, web tension, may be used. Hence, the control of the present invention is not to be construed solely as a motor speed control. Conductors 32 and 40 are joined at mixing junction 42 which provides an error signal to conductor 44. This error signal may be of either polarity and serves as a motoring control signal in one polarity and as a regenerative braking control signal in the other polarity.

The error signal in conductor 44 is applied to input amplifier 16. Amplifier 16, which is typically of the high gain type, provides a bi-polarity output signal having a magnitude proportional to the input signal up to an abrupt saturation point. A typical circuit which may be employed as amplifier 16 is shown on page 119 of the Transistor Manual, published by the General Electric Company, 7th edition, 1964.

The output signal of amplifier 16 in conductor 46 is provided to field circuit 18 in conductor 48 and to armature circuit 20 in conductor 50.

Field circuit 18 is supplied with input alternating current from a.c. supply lines 28 through transformer 52. The center tap of the secondary winding of transformer 50 is connected to one end of motor field winding 26. The ends of the secondary winding of transformer 52 contain two groups of oppositely poled thyristors 54 and 56 and 58 and 60 connected to the other end of winding 26. These thyristors control the direction of current flow through motor field winding 26, one group of thyristors being energized for each direction of current flow.

Figure 4:
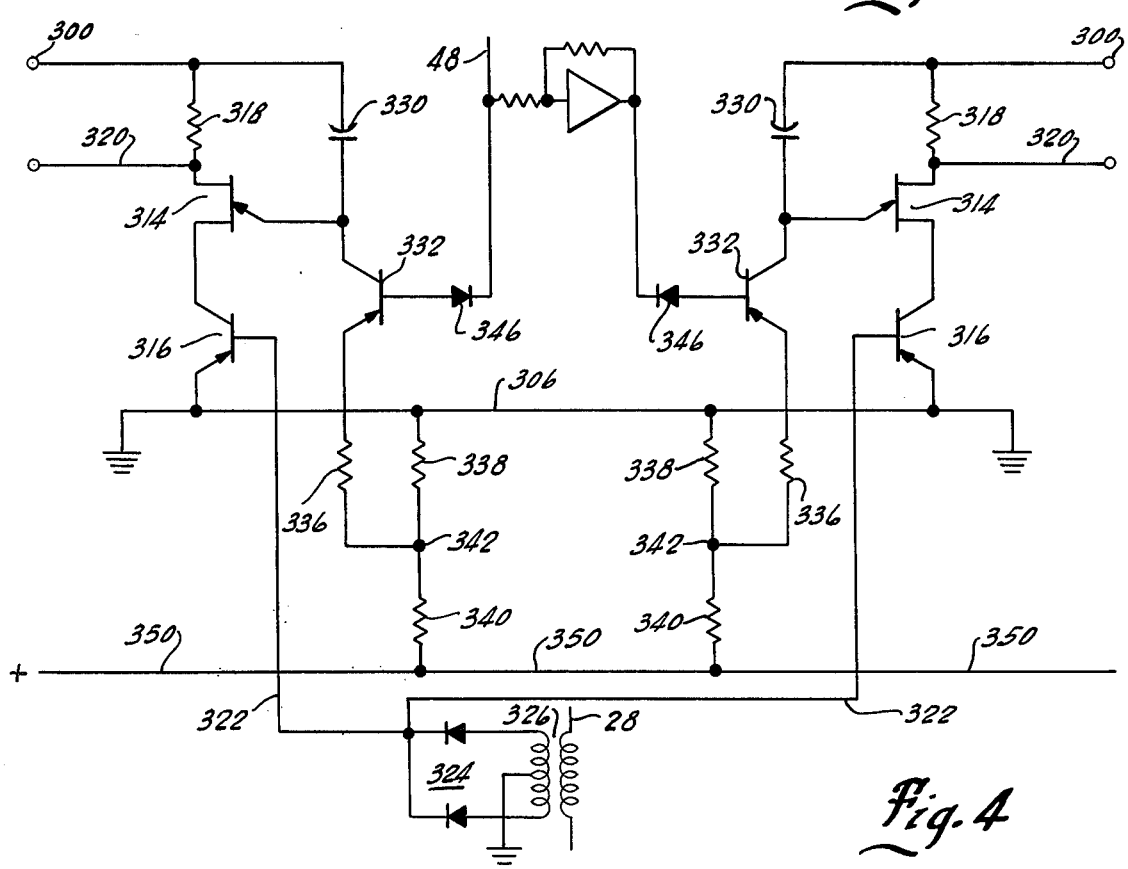
FIG. 4 is a schematic diagram of another embodiment of the firing circuit which may be incorporated in the improved field circuit of the present invention.

Field thyristor firing circuit 62, shown in greater detail in FIGS. 3 and 4, controls the operation of thyristors 54 through 60 in response to an input signal provided in conductor 48. The control provided by field thyristor firing circuit 62 determines which group of thyristors will be placed in the conductive state and the magnitude of field current.

Field circuit 18 also contains resistive means 66 connected in series with motor field winding 26. This resistive means acts as a means for sensing the polarity and magnitude of the current in motor field winding 26. Resistor 66 provides a feedback signal in conductors 68 and 70, corresponding to the magnitude of the current in the motor field winding, to the input of field thyristor firing circuit 62 for causing the magnitude of the field current to correspond to the signal in conductor 48. The field current signal from resistor 66 is also provided in conductor 72.

Armature circuit 20 is supplied with power from a.c. supply lines 28 through transformer 74. The amount of power provided to motor armature 24 is controlled by armature thyristor bridge 76 interposed between transformer 74 and motor armature 24. Bridge 76 contains thyristors 77 through 82. Bridge terminals 84 and 86 constitute the output terminals of control 10 at which the voltage reversal necessary for regenerative operation takes place.

Armature thyristor firing circuit 88 controls the operation of the thyristors in armature thyristor bridge 76 by means of firing signals in conductor 90. In order for control 10 to provide regenerative operation, armature thyristor firing circuit 88 must be capable of controlling the operation of the thyristors through at least a portion of both the positive and negative half cycles of the alternating current from supply lines 28. Such a firing circuit may be provided by altering the phase relationship of the synchronizing voltages to the circuit shown on page 132 of the aforementioned SCR Manual to permit the circuit to operate for the portion of the other half cycle. A suitable firing circuit is also shown in U.S. Pat. Nos. 3,456,176 and 3,486,102.

A current regulating amplifier 92 provides a bi-polarity input signal to armature thyristor firing circuit 98 in conductor 94. Current regulating amplifier 92 regulates the armature current during motoring and regenerative operation and utilizes a signal provided in conductor 96 as a reference and the armature current feedback signal from a sensing means, such as resistor 98, in conductor 100 as a feedback signal.

Coordinating means 102 has input receiving the signal from input amplifier 16 in conductor 50 and the field current signal in conductor 72. The output of coordinating means 102 is connected to conductor 96. Coordinating means 102 obtains coordination between the operation of field circuit 18 and armature circuit 70 during the transient period in which the reversal of the flow direction of the field winding current occurs. Coordinating means 102 deenergizes armature circuit 20 during this period. At other times, coordinating circuit 20 provides a signal in conductor 96 corresponding to the output signal of amplifier 16 which is used to energize armature circuit 20 and provide current to armature 24. Suitable coordinating means are shown in U.S. Pat. Nos. 3,435,316 and 3,475,671.

To operate motor 22, switch 104 in a.c. supply lines 28 is closed to energize the circuit of control 10. Reference signal source 30 is adjusted to provide a signal having a magnitude corresponding to the desired speed of motor 22 and a polarity corresponding to the desired direction of rotation. The reference signal is supplied through conductor 32 to junction 42 and thence to amplifier 16. Amplifier 16 produces an output in conductor 46 proportional in magnitude and polarity to the input signal. As armature 24 is not yet rotating, no feedback signal will be supplied by tach-generator 38.

Field circuit 18 utilizes the polarity of the output signal of amplifier 16 in conductors 46 and 48 to turn on either thyristors 54 and 56 or thyristors 58 and 60 by means of field thyristor firing circuit 52 so as to control the direction of rotation of motor 22. For example, thyristors 54 and 56 may be turned on by the positive polarity signal in conductors 46 and 48. The current provided by thyristors 54 and 56 provides current in the desired direction through field winding 26.

Field thyristor firing circuit 62 receives a negative polarity feedback signal from resistor 66 in conductors 68 and 70 which regulates the circuit and the firing of thyristors 52 and 54 to the desired field strength state.

The field current feedback current in conductor 68 is also provided in conductor 72 to provide a signal to the input of coordinating means 102. The output signal from amplifier 16 is applied to the other input of coordinating means 102. Coordinating means 102 provides an output signal to current regulating amplifier 92 in conductor 96 and to armature thyristor firing circuit 88 in conductor 94. Armature thyristor firing circuit 88 provides firing signals to the thyristors of armature thyristor bridge 76 in conductor 90 to energize and accelerate armature 24.

The acceleration of armature 24 causes tach-generator 38 to generate a feedback signal in conductor 40 which reduces the magnitude of the error signal in conductor 44. The regulation provided by control 10 causes motor 24 to assume the speed established by reference signal source 30.

Regenerative operation of control 10 may be brought on by reducing the reference signal in conductor 32 or by providing an overhauling load to armature 24.

In either case the feedback signal generated by tach-generator 38 in conductor 40 exceeds the reference signal generated by reference signal source 30 in conductor 32. This reverses the polarity of the error signal in conductor 44 and the polarity of the output signal from amplifier 16.

The reversed polarity of the output signal from amplifier 16 to field thyristor firing circuit 62 causes the latter to deenergize thyristors 52 and 54 and energize thyristors 56 and 58 in field circuit 18 to commence the reversal of the energization of motor field 26.

The reversed polarity of the output signal from amplifier 16 to coordinating means 102 removes the output signal of the coordinating means and the current from armature winding 24.

When the field current falls to zero and reverses direction coordinating means 102 reapplies the output signal in conductor 96 to reenergize motor armature 24. The signal operates armature thyristor firing circuit 88 to fire the thyristors in bridge 76 in the portions of the negative half cycles of the a.c. supply in which the a.c. supply voltage is more positive than the reversed counter e.m.f. provided by the reversed motor field thereby to cause motor 24 to regenerate power back to the a.c. supply.

The regeneration of power back to the a.c. supply will brake the speed of motor 22. When sufficient braking has been applied to reduce the speed of motor 22 to the desired level, as indicated by the reference signal in conductor 32, the feedback signal in conductor 40 will approach, equal, and again become less than the reference signal. This will prepare control 10 for motoring operation by reversing the polarity of the signal in conductors 44, 46 and 50 back to the original polarity and initiating another transient period. At the conclusion of this transient period, motor 22 resumes operation in the motoring state under the control of the reference signal in conductor 32 and the feedback signal in conductor 40.

Returning to field circuit 18, in the motoring operation initially described above, thyristors 54 and 56 are alternately rendered conductive by the voltages applied by the secondary winding of transformer 52 and by the appropriate firing circuit 62. The graph of the voltage at the right hand terminal of the field is shown by the graph 200 in FIG. 2a. FIG. 2a shows the half cycles of voltage with the thyristors fired fully on. This rectified voltage produces a d.c. current 202 through field winding 26. The conducting rectifier is indicated below each half cycle of graph 200.

With a firing circuit which does not insure that a firing pulse is provided during each half cycle, the operation of field circuit 18 when it is desired to reduce current 200 to zero is as follows. At some time $T_1$, thyristor 56 is not turned on during the appropriate half cycle because of the absence of a suitable signal in conductor 48 to field firing circuit 62. Thus, when the polarity of the signal in conductor 48 reverses, responsive to a reversal of the error signal, firing circuit 62 will cease to fire thyristors 54 and 56. However, current 202 will continue to flow through field winding 26 due to its inductive characteristics.

In order to maintain this current flow, field winding 26 becomes an electrical source whose voltage exceeds the applied voltage of transformer 52 during the negative half cycles for thyristor 54. The voltage generated in field winding 26 retains thyristor 54 in the conductive state during these negative half cycles. Thyristor 54 will continue to conduct during its normal, positive half cycles as it is then properly biased for conduction by the voltage from transformer 52.

The graph of FIG. 2a subsequent to time $T_1$ shows the voltage and current of field winding 26 under conditions in which thyristor 56 is not turned on. It will be noted that, in effect, alternating voltage applied to field winding 26. This causes the current through field winding 26 to decay with a slight ripple to zero at time $T_2$. At this time, thyristor 54 becomes non conductive as there is no current through it and the voltage across field winding 26 ceases. It may be noted that the decay of inductive current in field winding 26 in the above circumstances is no more satisfactory than the inductive time constant of the field winding.

It may also be noted that during the time that field winding 26 may be considered a voltage source, field winding 26 is regenerating power to alternating current lines 28 as current is maintained in the same direction as before but the polarity of the source terminals in transformer 52 has reversed. However, during the positive half cycles of the voltage applied to thyristor 54, power is supplied to winding 26 from transformer 52. This supply and regeneration of power results in little net difference and for practical purposes may be disregarded. Thus, there is no net regeneration or power supply to field winding and the inductive energy of winding 26 is dissipated in its resistive portion.

The firing circuit 26 of the present invention insures that a firing pulse is generated during each half cycle of alternating current towards the end of the half cycle. These pulses are used to rapidly reduce the current in motor field winding 26 to zero by regenerating the inductive energy of the field winding 26 through transformer 52 back to the a.c. supply lines 28. For example, thyristors 54 and 56 may be fired on approximately 10° before the end of each half cycle of applied alternating voltage. The effect of this operation is seen from FIG. 2b. As before, a plurality of cycles may be assumed to have preceded the graph shown in FIG. 2b. Also as before, thyristor 54 is fired on but thyristor 56 is not turned on its appropriate time to conduct current through field winding 26 from transformer 52. This causes thyristor 54 to continue to remain on to conduct current from winding 26, as a source, through transformer 52 to a.c. lines 28 as a load. Approximately 10° before the end of negative half cycle, thyristor 56 is fired on. This turns off thyristor 54 as the current now has an alternative path through thyristor 56 which is preferred since it is in the direction that transformer 52 desires to provide power to winding 26. Thyristor 56 conducts power to winding 26 for the remaining 10° of the half cycle. At the end of the half cycle, the regenerative operation continues as thyristor 54 is not turned on and thyristor 56 is forced to remain on as the only path available for inductive current flow. As the voltage of transformer 52 reverses, current is supplied to its positive terminal thereof forming the regenerative action.

For subsequent half cycles, similar operations are performed. That is, thyristor 54 is turned on in the last 10° of the next half cycle to regenerate the inductive energy of field winding 26 back to power lines 28 when the voltage of transformer 52 again reverses. The net effect is a very large regenerative portion of each half cycle and a small power supplying portion; the power supplying portions being only the final 10° of the half cycle. This rapidly reduces the current in field winding 26, as shown in FIG. 2b.

FIG. 3 shows one embodiment of firing circuit 62. Firing circuit 62 is energized by a d.c. supply connected to terminals 300 and 302 which provide negative voltage in power supply bus 304 and grounded bus 306.

Firing circuit 62 is comprised of a pair of pulse generators 308 and 310. Pulse generator 308 provides firing pulses to thyristors 54 and 56. Pulse generator 310 provides firing pulses by thyristors 58 and 60. Pulse generators 308 and 310 are generally similar and pulse generator 308 is described in detail below.

Conductor 312 connected between bus 304 and bus 306 includes series connected unijunction transistor 314 and transistor 316. More specifically, conductor 312 includes the base elements of unijunction transistor 314 and the emitter-collector path of transistor 316. Conductor 312 also includes bias resistor 318. Conductor 320 connected intermediate unijunction transistor 314 and resistor 318 provides firing pulses to thyristors 54 and 56.

The base of transistor 316 is connected to a synchronizing signal to insure that the operation of pulse generator 308 is synchronized with the half cycles of alternating current applied to thyristors 54 and 56. Conductor 322 is connected to the base of transistor 316 and through rectifier 324 to transformer 326 connected to alternating current supply lines 28.

Conductor 328 connected between bus 304 and bus 306 includes a capacitor 330 and the emitter-collector circuit of transistor 332. Conductor 334 is connected to conductor 328 intermediate capacitor 330 and transistor 332 and to the emitter of unijunction transistor 314. Resistor 336 is provided in series with the emitter of transistor 332.

A voltage divider comprised of resistors 338 and 340 connected between bus 304 and bus 306 provides a bias voltage to junction 342 and to the base terminal of transistor 332 in conductor 344. The input signal from amplifier 16 in conductor 48 is provided through diode 346 to junction 342.

As noted above, pulse generator 310 is similar in construction to pulse generator 308. In order that one polarity of the input signal in conductor 48 may energize pulse generator 308 and thyristors 54 and 56 and the other input signal polarity may energize pulse generator 310 and thyristors 58 and 60, an inverting amplifier 348 is interposed between conductor 48 and diode 346 of pulse generator 310.

The operation of pulse generator 308 in the absence of an appropriate firing signal in conductor 48 is as follows. At the commencement of each half cycle of alternating current applied to thyristors 54 and 56, a signal is provided from transformer 326 through rectifier 324 and conductor 322 to the base of transistor 316 rendering that transistor conductive and biasing unijunction transistor 314 into a potentially operative state. Prior to the time unijunction transistor 314 is so biased, any charge on capacitor 330 is bled through the emitter-base circuit of the unijunction transistor.

At the same time the bias is applied to unijunction transistor 314, the voltage divider comprised of resistors 338 and 340 provides a signal at junction 342 and in conductor 344 which renders transistor 332 conductive and initiates a current flow in conductor 338 which commences the charging of capacitor 330. The current so provided and the charge rate of capacitor 330 is such that as the end of the half cycle of alternating current approaches, the charge on capacitor 330 attains a level just below the peak emitter voltage of the unijunction transistor 314 necessary to fire the unijunction transistor with the bias level provided by transistor 316.

When the bias provided by transistor 316 drops as the end of the half cycle approaches, the charge on capacitor 330 is sufficient to trigger unijunction transistor 314. A low resistance discharge path is provided in the unijunction transistor and the energy of capacitor 330 is discharged through unijunction transistor 314 to provide a thyristor gating pulse to thyristors 54 and 56 in conductor 320 to render the thyristors conductive. The voltage drops in transistor 316 are such that unijunction transistor 314 is rendered conductive approximately 10° prior to the end of the half cycle. The magnitude of resistors 338 and 340 of the voltage divider selected so that the voltage level of capacitor 330 provides both the desired timing to pulse generation, as well as a pulse of sufficient magnitude to fire thyristors 54 and 56. The same operation occurs in pulse generator 310 so that firing pulses are supplied to all four rectifiers field circuit 18. However, the positive voltage generated in two of the thyristors is opposed by the negative voltage generated in the other two thyristors so that the net effect of the voltage across winding 26 is zero.

When an appropriate input signal is provided in conductor 48 to firing circuit 62, one or the other of pulse generators 308 and 310 will respond, depending on the polarity of the signal. For exemplary purposes, it may be assumed that the polarity of the signal in conductor 48 is such as to energize pulse generator 308. The signal in conductor 48 passes through diode 346 to junction 342 and through conductor 344 to the base of transistor 332. This increases the charge rate of capacitor 330 so that the capacitor voltage exceeds the peak emitter voltage of unijunction transistor 314 necessary to trigger unijunction transistor 314 with the full bias provided by transistor 316. The unijunction transistor generates firing pulses to thyristors 54 and 56. The firing of thyristors 54 and 56 is advanced into the half cycles of alternating current and commences the flow of current through motor field winding 26. The amount of advance and the instant of pulse generation is determined by the magnitude of the signal in conductor 48.

While pulse generator 308 generates firing pulses to the thyristors 54 and 56 responsive to the input signal in conductor 48, pulse generator 310 continues to generate firing pulses to thyristors 58 and 60 responsive to the bias signal provided by the voltage divider 338-340 in that pulse generator.

These firing pulses provided to thyristors 58 and 60 in the terminal portions of the half cycles generate a current which opposes the current in thyristors 54 and 56. However, this condition terminates as the applied voltage reverses and the power loss to motor field winding 26 is of minor significance since it exists for only 10° of the cycle.

When it is desired to regeneratively discharge motor field winding 26, the polarity of the input signal in conductor 48 is reversed. The input signal in conductor 46 to junction 342 is removed by the blocking action of diode 346. This retards the firing angles of thyristors 54 and 56. The signal remaining at junction 342 and provided by the voltage divider comprised of resistors 338 and 340 generates firing pulses to thyristors 54 and 56 approximately 10° before the end of the half cycle to provide the regenerative discharge shown in FIG. 2b. The reversed polarity of the input signal in conductor 48 applies the signal to pulse generator 310 to commence current flow in motor field winding 26 in the opposite direction when the regenerative discharge is complete.

FIG. 4 shows an alternative embodiment of the firing circuit of the present invention in which the voltage divider comprised of resistors 338 and 340 is connected between neutral bus 306 and a positive bus 350. The junction 342 of the voltage divider is connected through resistor 352 to the emitter terminal of transistor 332 to control the minimum amount of current through the transistor and the charge rate of capacitor 330 connected to the emitter of unijunction transistor 314.

The operation of the circuitry shown in FIG. 4 is similar to the circuitry shown in FIG. 3 in that the voltage divider comprised of resistors 338 and 340 provides a minimum charging current level to capacitor 330 which insures generation of a firing pulse by unijunction transistor 314 near the end of the half cycles of alternating current applied to the thyristors.

Various modes of carrying out the invention are contemplated as being within the scope of the following claims particularly pointing out and distinctly claiming the subject matter which is regarded as the invention.

I claim:

1. In a static regenerative direct current motor control which obtains regeneration of power from a motor operatively associated with the regenerative control to an alternating current power supply by reversing the motor field winding current, a motor field winding circuit means for providing current energization to the motor field winding and for reversing, through zero energization, the direction of current flow through the motor field winding, said field circuit means including:

thyristor means connectable to the alternating current power supply and motor field winding and responsive to half cycles of current from the power supply for providing current flow in either direction through the motor field winding from the power supply; and a firing circuit for operating said thyristor means in accordance with a bi-condition input signal from the regenerative control to provide current flow in one direction through the motor field winding when the input signal is in one condition and operating said thyristor means to provide current flow in the other direction through the motor field winding when the input signal is in the other condition, said firing circuit including a pair of pulse generators coupled to said thyristor means and responsive to the bi-conditional input signal from the regenerative control for energizing one of said pulse generators to provide current flow in one direction through the motor field winding when the input signal is in one condition and energizing the other of said pulse generating means to provide current flow in the other direction through the motor field winding when the input signal is in the other condition, each of said pulse generators comprising a pulse generating means having an output coupled to said thyristor means, said pulse generating means including means for synchronizing the operative state of said pulse generating means with the half cycles of alternating current applied to said thyristor means, said pulse generating means being energizable by a control signal when in the operative state for generating a firing pulse at said output at a point in the conductive half cycle of alternating current determined by the magnitude of the control signal; and control means coupled to said pulse generating means and including bias means for establishing a control signal to said pulse generating means having a minimal magnitude sufficient to energize said pulse generating means to generate a firing pulse in the terminal portion of each half cycle, said control means having an input receiving the input signal from the regenerative control for increasing the magnitude of the control signal beyond that provided by said bias means to advance the energization of the pulse generating means and the generation of the firing pulse in each conductive half cycle to provide current through the field winding in accordance with the input signal.

2. The circuit means according to claim 1 wherein said bias means is connected to said control means input.

3. The circuit means according to claim 1 wherein said control means includes a voltage responsive element for determining the energization of said pulse generating means, said voltage responsive element having an input receiving said input signal from the regenerative control, and said bias means comprises a voltage divider coupled to said input.

4. The circuit means according to claim 3 wherein said voltage responsive element comprises a voltage responsive controllable current conduction device.

5. The circuit means according to claim 4 wherein said controllable current conduction means comprises a transistor, the current of which determines the energization of said pulse generating means.

6. The circuit means according to claim 5 wherein said pulse generating means includes an oscillator having a unijunction transistor and a triggering capacitor connected in series with said transistor.

7. The circuit means of claim 6 wherein said pulse generating means includes a second current conduction device connected in series with said unijunction transistor and couplable to the alternating voltage for synchronizing the operative state of said pulse generating means with the half cycles of alternating current applied to said thyristor means.

* * * * *